United States Patent [19]

Tash

[11] Patent Number: 5,427,153
[45] Date of Patent: Jun. 27, 1995

[54] EXPANDABLE PLUG FOR DRAIN PIPES

[76] Inventor: George Tash, 5777 Balcolm Canyon, Somis, Calif. 93021

[21] Appl. No.: 63,963

[22] Filed: May 20, 1993

[51] Int. Cl.$^6$ ............................................ F16L 55/12
[52] U.S. Cl. ..................................... 138/93; 138/89; 134/167 C
[58] Field of Search ............................ 138/89, 20, 93; 134/167 C; 4/295

[56] References Cited

U.S. PATENT DOCUMENTS

| | | | |
|---|---|---|---|
| 1,180,282 | 4/1916 | Bunn . | |
| 1,506,418 | 8/1924 | Evensta . | |
| 2,171,023 | 8/1939 | Buxton . | |
| 2,279,257 | 4/1942 | Svirsky . | |
| 3,034,522 | 5/1962 | Lithun | 134/167 C |
| 3,190,679 | 6/1965 | Lester | 138/93 |
| 3,195,548 | 7/1965 | Lestakis | 134/167 C |
| 3,241,571 | 3/1966 | Garcia | 138/93 |
| 3,431,945 | 3/1969 | Robillard . | |
| 3,802,449 | 4/1974 | Mulinex . | |
| 3,840,033 | 10/1974 | Warsinger | 134/167 C |
| 4,460,019 | 7/1984 | Condon . | |
| 4,475,255 | 10/1984 | Tash | 134/167 C |
| 4,660,603 | 4/1987 | Tash . | |
| 4,790,356 | 12/1988 | Tash . | |
| 4,865,062 | 9/1989 | Tash | 134/167 C |
| 5,234,034 | 8/1993 | Lyon | 138/93 |

FOREIGN PATENT DOCUMENTS 1511812  5/1978  United Kingdom .

Primary Examiner—James E. Bryant, III
Attorney, Agent, or Firm—John J. Posta, Jr.

[57] ABSTRACT

The improved drain plug device is formed in accordance with the present method. The device includes an elongated, hollow, flexible, resilient, unitary, self-supporting tubular member having a central passageway extending all the way therethrough to the exits in the opposite ends of the member. The member has a rear bulbous inlet portion, a middle very flexible portion to allow the member to bend around curves in drain lines, and a front bulbous outlet portion. The inlet and outlet portions have the same sidewall thickness while that of the middle portion is preferably somewhat thicker. Preferably, the middle portion is narrower in diameter than the other portions of the member. The outlet portion has a higher Shore hardness than the inlet portion and therefore expands radially under internal fluid pressure more slowly than the inlet portion but collapses, after removal of such pressure, at a faster rate, thus assuring that water in the tubular member during use thereof will not back up and out the inlet exit. The inlet is fitted with a pressure hose connector and the outlet with a pressure relief valve. The method includes molding the tubular member after supplying a mold with two different rubber-like moldable compositions so that, when set, the three portions of the member will exhibit their separate characteristic properties. The method also includes fitting the member with the connector and relief valve.

17 Claims, 3 Drawing Sheets

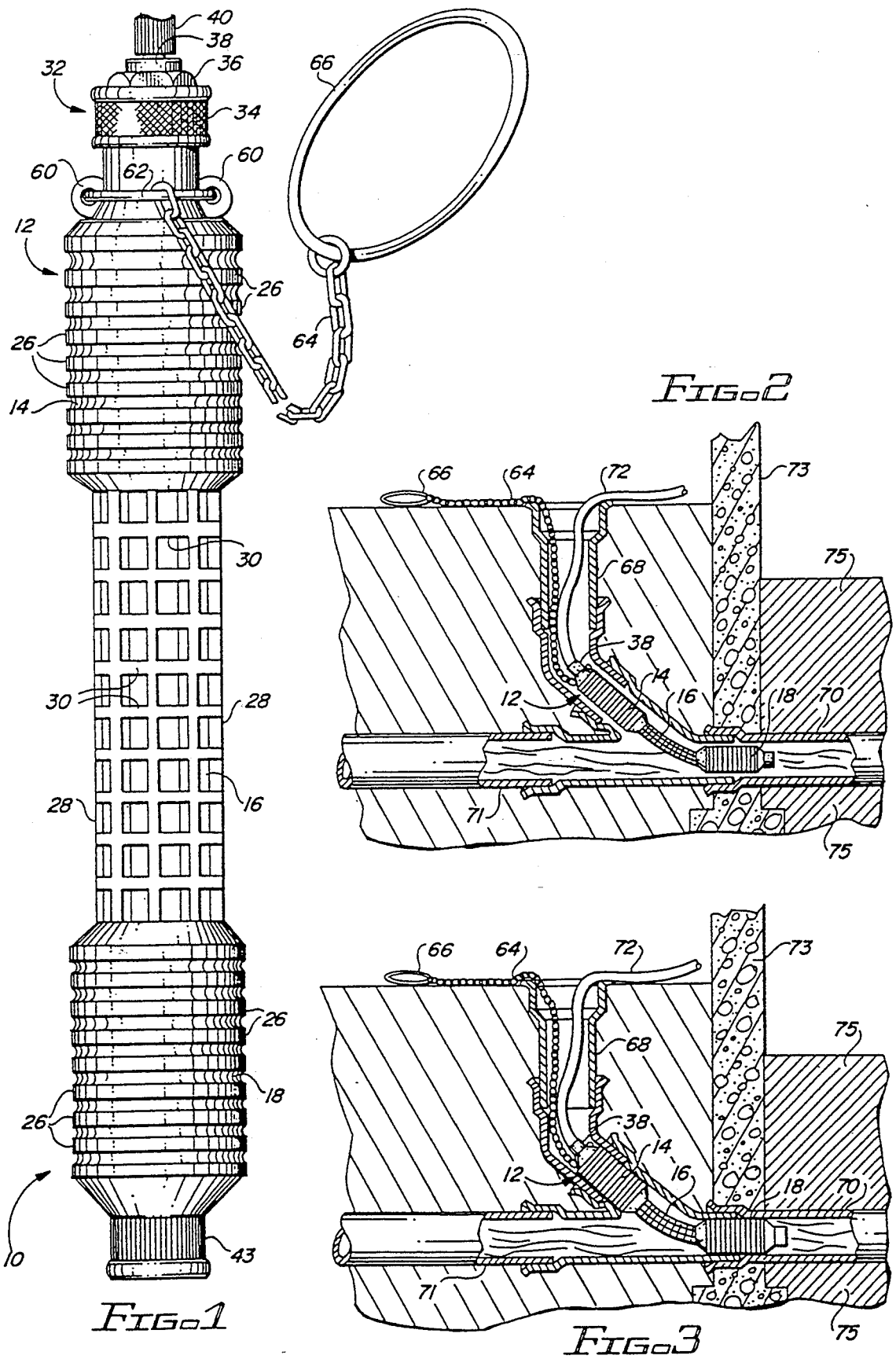

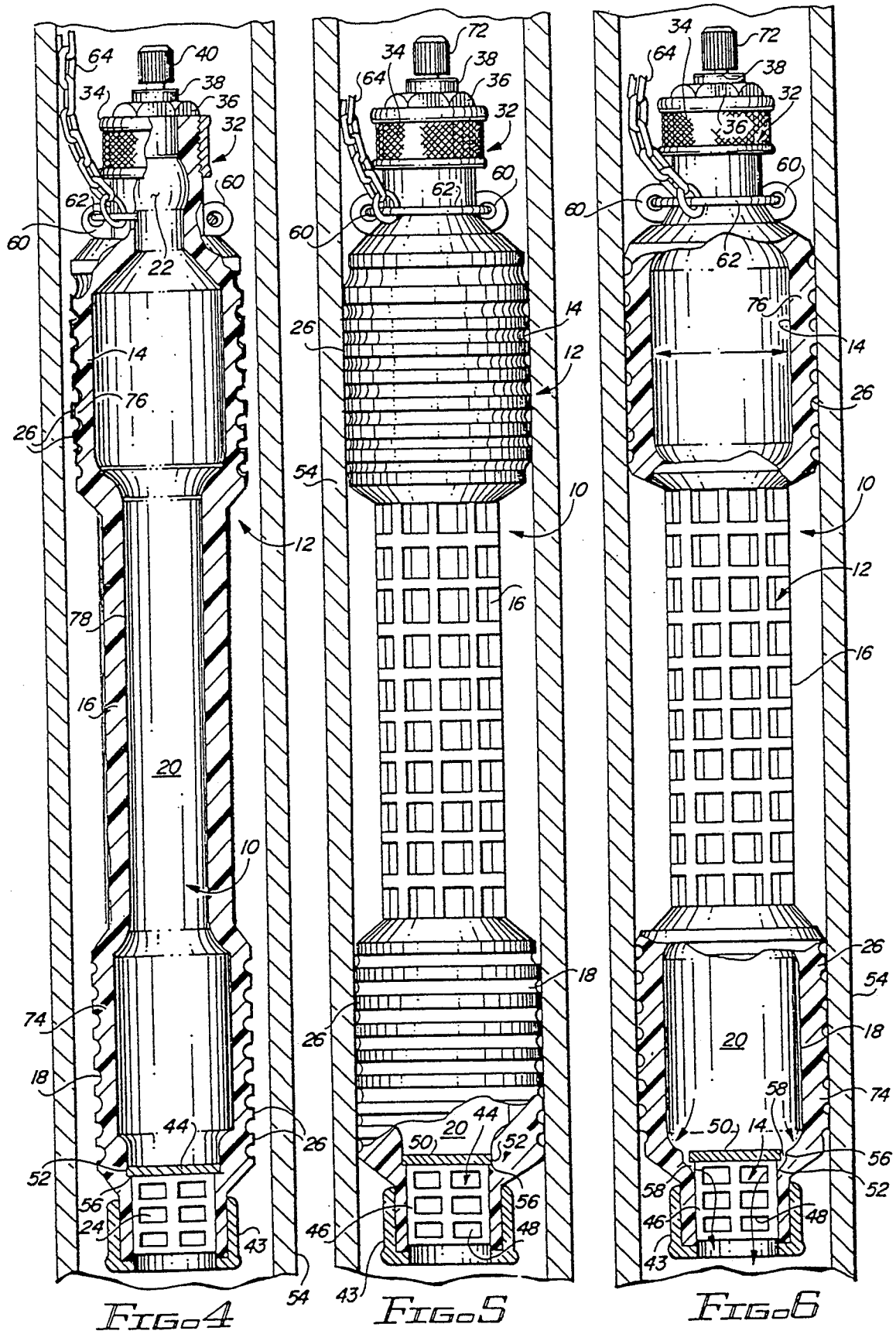

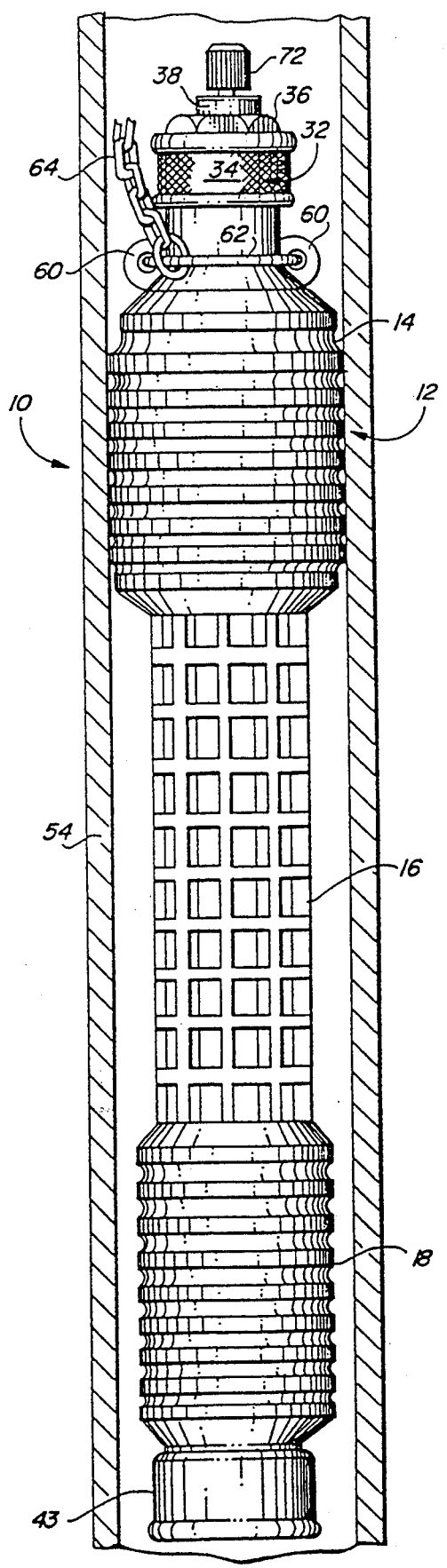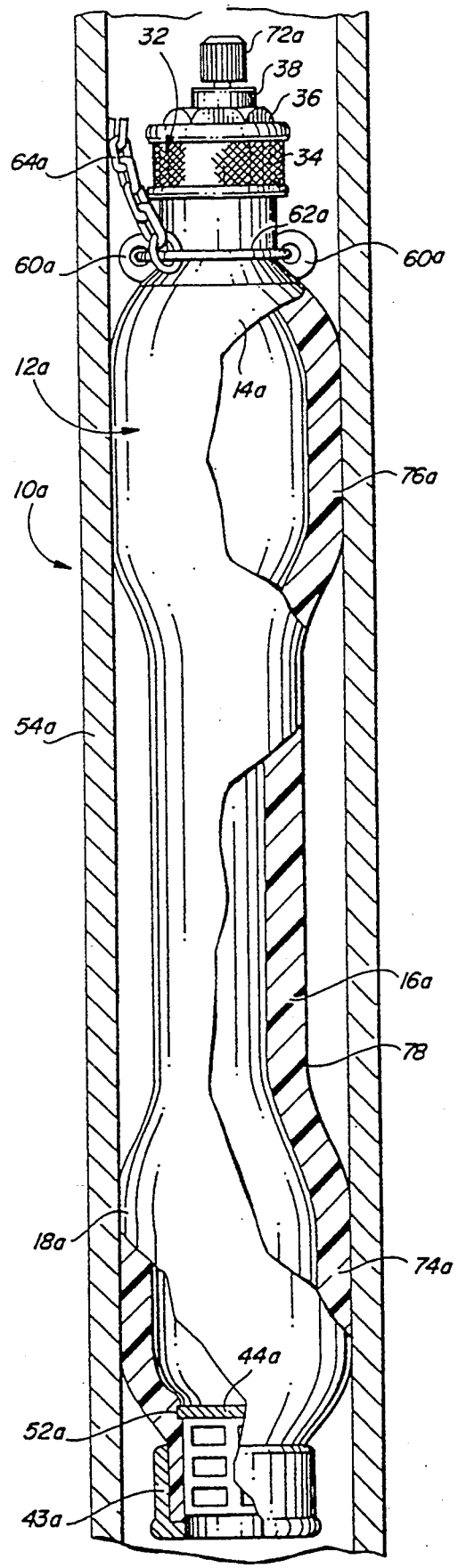

5,427,153

EXPANDABLE PLUG FOR DRAIN PIPES

BACKGROUND OF THE INVENTION

1. Field of the Invention

The present invention generally relates to plumbing devices and, more particularly, to an improved device for temporarily plugging drain pipes in order to test the same.

2. Prior Art

When a new home, condominium or apartment house or the like is constructed, the drains must be tested for leaks before they can be approved by an inspector. This is usually accomplished by first inserting a temporary plug device through the clean-out pipe located outside the structure to a point where it intersects a sewer line running from the structure drain to the main sewer line. Such plug device usually is an elongated hollow expansible sausage-like unit which has a nipple at one end through which air or water is introduced into the unit until the unit expands sufficiently so that one end blocks the clean-out pipe while the other end of the device seals off the sewer line. Water can then be introduced into the entire house drain and sewer system to check for leaks.

Such a conventional plug device has several drawbacks. Thus, the device is usually difficult to slide into place and to retrieve due to its shape. Moreover, when the device is deflated, the fluid from the house drains not only flows into the sewer line but also backs up through the clean-out pipe, especially in multi-story structures, creating a sanitation hazard. Moreover, the device usually is adapted for use only with one diameter of pipes, necessitating various different sizes of the device to use in various plumbing systems. In addition, if the device is subjected to excess pressure during use, it will rupture, with possible serious injury to workmen and the plumbing and sewage system.

Accordingly, there is a need for an improved type of drain pipe plug device which can be inflated with either a liquid or a gas, and is safe to use. Such device should be easy to insert and retrieve, should not rupture even when subjected to excess inflation, pressure, and should be adaptable to various drain pipe diameters. Of more importance, the device should prevent, upon its deflation after the drain test is run, back-flow of fluid from the house drains into the clean-out pipe.

A drain pipe plug device has been devised which satisfies most of the foregoing needs and is set forth in U.S. Pat. No. 4,660,603, issued to George Tash, the inventor of the present invention. The drain pipe plug device of U.S. Pat. No. 4,660,603 employs a resilient, flexible, elongated member of rubber or the like having a front outlet portion, a rear inlet portion and a particularly flexible middle portion of reduced diameter. The sidewall of the outlet portion is thicker than that of the inlet portion so that the outlet portion collapses first during deflation of the device from its expanded blocking state in a drain pipe, assuring that fluid from the house drain into which it has been inserted passes out the sewer line, not back up the clean-out pipe. However, the relative thicknesses of the outlet portion and the inlet portion must be carefully controlled during manufacture of the device in order to achieve the desired results. This requires careful monitoring of the tolerances of the mold configuration in which the device is made, an expensive procedure.

Accordingly, there remains a need for an improved drain pipe plug device which can be manufactured more easily and less expensively than the aforesaid patented device and which provides all the advantages of that device.

SUMMARY OF THE INVENTION

The improved drain pipe plug device of the present invention and the improved method of making the same satisfy all the foregoing needs. The device is substantially as set forth in the Abstract. Thus, the device comprises an elongated, generally tubular, hollow radially expandible, flexible, resilient unitary member of rubber or the like having a front outlet portion, a rear inlet portion and a particularly flexible middle portion of reduced diameter. A central passageway extends the length of the device and terminates in a rear inlet to which a connector is secured, and a tapered front outlet in which a pressure relief valve is disposed.

The connector is adapted to receive a gas pressure hose and a water hose, as desired. The sidewall of the outlet portion is of essentially the same thickness as but is of a greater shore hardness than that of the inlet portion. Therefore, when the device is installed with its inlet portion in the clean-out pipe, its middle portion bent around the clean-out pipe-sewer line intersection and its outlet portion in the sewer line, its outlet portion sidewall expands radially more slowly than said inlet portion sidewall but collapses first during inflation of the device from its expanded blocking state, assuring that fluid from the house drain passes out the sewer line, not back up the clean-out pipe.

The devices tapered front portion and ribbed exterior facilitate ease of insertion of the device into drain lines and removal therefrom. Moreover, the pressure relief valve prevents blow-out of the device with consequent injury to plumbing, sewage lines, adjacent structural components and personnel. The pressure relief valve operates to automatically open the internal passageway in which it is seated when the internal pressure in the device rises to a point which causes the sidewall of the front portion to expand radilly away from the relief valves block plate.

The device is inexpensive, simple, durable, efficient and safe to use. Other advantages of the device are set forth in the following detailed description and accompanying drawings.

DRAWINGS

FIG. 1 is a schematic side elevation of a first preferred embodiment of the improved drain plug device of the present invention, showing the device in the resting unexpanded condition;

FIG. 2 shows the device of FIG. 1 inserted in the unexpanded condition through a clean-out pipe and into a sewer line;

FIG. 3 shows the device of FIG. 1 in the expanded condition in the clean-out pipe and sewer line, and blocking flow of fluid through the clean-out pipe and sewer line;

FIG. 4 is a schematic side elevation, partly in section and partly broken away oft he device of FIG. 1 in the unexpanded condition in a drain or a sewer pipe.

FIG. 5 is a schematic side elevation, partly in section and partly broken away, of the device of FIG. 4 fully expandéd so as to seal the pipe in which it is disposed;

FIG. 6 is a schematic side elevation, partly broken away, showing the device of FIG. 4 under sufficient pressure to cause the pressure relief valve thereof to operate to allow reduction of excess pressure and flow of fluid around the valve plate and out of the device;

FIG. 7 is a schematic side elevation of the device of FIG. 4 during inflation, with the outlet portion thereof collapsing first, thus allowing passage of fluid therearound while the inlet portion thereof still seals the pipe it is in; and FIG. 8 is a schematic side elevation, partly broken away, and partly in section, of a second preferred embodiment of the improved drain pipe plug device of the present invention, with the device shown in a fully expanded sealing condition in a pipe.

DETAILED DESCRIPTION

FIGS. 1-7

Now referring more particularly to FIGS. 1 thru 7 of the drawings, a first preferred embodiment of the improved drain plug device of the invention is schematically depicted therein. Thus, device 10 is shown which, as shown in FIGS. 1 and 4, comprises an elongated, hollow, tubular, generally cylindrical, resilient, flexible member 12 fabricated of elastomeric material such as natural or synthetic rubber, plastic or the like. Member 12 is capable of expanding radially under internal fluid pressure to block a drain pipe, sewer line or the like.

Member 12 has an inlet portion 14 integrally connected to an elongated very flexible middle portion 16, in turn integrally connected to an outlet portion 18 to form a unitary structure. Middle portion 16 is of reduced external diameter with respect to portions 14 and 18. An internal central fluid passageway 20 is disposed throughout the length of member 12 terminating in a narrow inlet 22 and a narrow outlet 24. It will be noted that portions 14 and 18 have a plurality of spaced, transverse, integral external reinforcing ribs 26, while portion 16 has a plurality of spaced external reinforcing ribs 28 running longitudinally and interconnecting spaced, transverse reinforcing ribs 30. Ribs 26, 28 and 30 reduce frictional contact of member 12 with the walls of pipes through which they must pass to be placed in a proper blocking location.

Device 10 also includes a dual connector 32 secured to inlet 22 and comprising a water hose connector ring 34 in which is releasably screwed a plug 36 bearing a gas hose fitting 38 and removable cap 40. Accordingly, member 12 is adapted to receive a gas such as air under pressure through fitting 38 into passageway 20, or, when plug 36 is removed, a liquid such as water under pressure through ring 34 into passageway 20, all for the purpose of radially expanding portions 14 and 18 to block, respectively, the clean-out pipe and sewer line leading from a house, in order to test the houses plumbing.

It is necessary that member 12 be able to hold pressure in passageway 20. Therefore, it is fitted in outlet 24 with a pressure relief valve 42, which normally blocks passageway 20 (FIGS. 4 and 5) and an external fitting 43 which restricts the expansion of outlet 24. Thus, valve 42 comprises an open tubular cage 44 having spaced interconnected transverse ribs 46 and longitudinal ribs 48 and an imperforate transverse blocking plate 50. Cage 44 can be formed of metal, ceramic, hardened rubber, plastic or the like. Plate 50 is normally located adjacent the rear end of cage 44 in a transverse groove 52 in the narrow outlet 24 of portion 18 to completely block passage of pressurized fluid out of outlet 24, even when portion 18 is radially expanded sufficiently to block pipe 54 (FIG. 5).

However, when member 12 is over pressurized (FIG. 6), the part 56 of portion 18 defining groove 52 is forced radially outwardly from the outer periphery of plate 50 sufficiently to open a fluid by-pass space 58 therebetween through which excess pressurized fluid by-passes plate 50 and passes through cage 44 and out of member 12 until part 56 is allowed to collapse or flex back against plate 50 to close space 58. Cage 44 during the by-passing may move back slightly as shown in FIG. 6, or remain stationary, depending on the particular configuration of part 56. Thus, valve 42 functions to protect member 12 against over pressurization and block-out, with consequent injury to piping surrounding building components and personnel.

Device 10 may further include a pair of ears 60 receiving a transverse ring 62 (FIG. 1) in portion 14 to which may be connected one end of a chain 64, the other end of which may be connected to a pull ring 66 to prevent loss of member 12 down a sewer line while member 12 is in the uninflated state and to enable member 12 to be easily drawn from such line.

It will be noted that member 12 is self-supporting, even in the uninflated state. Thus, it can be easily slid down a clean-out pipe 68 (FIG. 2) and around the angled junction of pipe 68 with sewer line 70 which is also joined to and runs from house drain 72 under a foundation 73 and out to a sewer main (not shown) below ground 75. Member 12 is first passed into the desired blocking position with portion 18 in line 70 and portion 14 in pipe 68, while member 12 is in the unexpanded state. Portion 16 easily flexes around the indicated junction. In FIG. 2, member 12 is shown connected through fitting 38 to a pressurized gas line 72, so that when gas is introduced therethrough to inflate member 12 (FIG. 3) portions 14, 16 and 18 all expand radially, portions 14 and 18 expanding sufficiently to block, respectively, clean-out pipe 68 and sewer line 70 to allow the previously described test to be run by introducing water into the home sewer and checking for leaks. FIG. 4 shows the unexpanded state of member 12. FIG. 5 shows the expanded full blocking state of member 12, such as that also illustrated in FIG. 3, while FIG. 6 shows the over-expanded state which causes valve 42 to operate as previously described. FIG. 7 illustrates another important feature of device 10. Thus, it will be noted from FIGS. 4 and 6 that the thickness of the sidewall 74 of portion 18 is the same as that of the sidewall 76 of portion 14. For example, tubular member 12 may be about 19 or 20 inches in length, exclusive of connector 32, with an overall length of about 20.75 inches, portion 16 being about 8 inches long and 1.7 inches in diameter, portion 14 being about 6.75 inches long and 2.3 inches in diameter, portion 18 being about 6.25 inches long and about 2.3 inches in diameter. Other sizes are also suitable.

The thickness of sidewall 76 between ribs 26 may be, for example, about 0.250 inch, the same as that of sidewall 74 between ribs 26. Ribs 26 may be, for example, about 0.150 inch in uniform thickness in both portions 14 and portion 18. The thickness of sidewall 78 of portion 16 preferably is slightly greater than but can be identical to that of sidewalls 74 & 76. Ribs 28 and 30 thereof may be, for example, about 0.10 inch in thickness.

Although sidewalls 76 and 78 are of about or are exactly the same thickness, facilitating manufacture of the mold in which member 12 is formed, sidewalls 76 and 78 are of different Shore hardnesses. Shore hardness or Shore scleroscopic hardness refers to a method of determining the hardness of a substance. What is measured is the extent of rebound of a diamond-tipped hammer dropped from a fixed height onto the surface of the substance to be tested. Although the test was originally applied to metals, it is also suitable for use in determining the characeristics of elastic substances, such as rubber, both natural and snythetic and elastomeric plastic materials.

A rubber or rubber-like substance in the form of a hollow tube of a given Shore hardness, resists radial expansion under internal radial pressure applied to the hollow interior of the tube, for example, by having air or another gas or water forced into the hollow interior of the tube, to a greater extent than does a similarly configured hollow tube of a rubber or rubber-like substance having a lower Shore hardness. Hence the tube with the lower Shore hardness radially expands first under increasing internal pressure. However, as that internal radial expansion pressure is released, it is the tube with the greater Shore hardness which collapses first. This principle is applied in forming the improved device of the present invention.

Member 12 of device 10 is made in accordance with the improved method of the present invention. Thus, the present method comprises molding member 12 in a mold while utilizing a first rubber-like composition of a first pre-selected Shore hardness (in the set state) for sidewall 76 of inlet portion 14 and while also utilizing a second rubber-like composition of a second pre-selected Shore hardness for sidewall 74 of outlet portion 18, and while also employing in the mold a third rubber-like composition for middle portion 16.

The thickness of walls 74 and 76 is the same or essentially the same, while the thickness of sidewall 78 is preferably greater than that of sidewalls 74 and 76. Middle portion 16 is composed of rubber-like material which in the set state has increased flexibility and resilience when compared with those qualities of inlet portion 14 and outlet portion 18.

The described rubber-like compositions can be of conventional natural or artificial rubber or elastomeric plastic or the like. Their Shore hardnesses are controlled by the concentration and nature of the additives mixed into the compositions when they are in the uncured state before molding of member 12 takes place. The following specific Example sets forth certain features of the present method:

EXAMPLE

| rubber (natural) latex | 80% |
| silica filler | 5% |
| sulfur | 1.5% |
| magnesia filler | 0% |

A second rubber molding composition is formed, for use in the fabrication of outlet portion 18 of member 12, by mixing together the following relative proportions, by weight, of ingredients:

| rubber (natural) latex | 50% |
| silica filler | 35% |
| sulfur | 2% |

-continued

| magnesia filler | 0% |

All two rubber molding compositions are of a putty-like consistency when added to the appropriate separate areas of the mold, and are then subjected to conventional vulcanizing conditions (about 110°–140° C.) in the mold to cause them to set to a solid elastic state. Since the three areas of the mold are contiguous, the compositions during setting in the mold merge and bond together at the boundaries of the areas to form a unitary self-supporting finished device in accordance with the present invention, with differing flexibilities and Shore hardness.

Thus, tubular member 12 has a length of about 21 inches, portion 16 being 8 inches long and 1.7 inches in diameter, portion 14 being about 6.75 inches in length and 2.3 inches in diameter, and portion 18 being about 6.25 inches long and about 2.3 inches in diameter. The thickness of each of sidewalls 74 and 76 between ribs 26 is about 0.250 inch and ribs 26 may each be about 0.150 thick. Ribs 28 and 30 may be, for example, about 0.10 in thickness. Outlet portion 18 has a Shore hardness of about 60. The Shore hardness of inlet portion 14 is about 45, that is, significantly less than that of outlet portion 18.

The thickness of sidewall 78 of portion 16 between ribs 28 and 30 is about 0.35 inch. It will be understood that other suitable dimensions for the components of member 12 can be employed. Device 10 constructed in the described manner functions properly to block a drain line when expanded with water under pressure and to cause the water to exit outlet 18 and not back up and out inlet 14 when the water pressure is removed and member 12 collapses.

When parallel tests were run utilizing the method set forth above, but varying the concentration of ingredients for the compositions forming outlet portion 18 and inlet portion 14, so as to provide portion 18 with a Shore hardness about 60 and portion 14 with a lower Shore hardness about 45, comparable results were obtained to those set forth above. The finished member 12 functioned in device 10 in the same manner and with the same efficiency as noted for the member 12 formed in the above Example. When, in further parallel tests, slightly different relative sizes of the components were used from those set forth in the Example, substantially identical results were still obtained.

Thus, when at the end of the tests, pressure is relieved through line 72, as shown in FIG. 7, to deflate member 12 from the state shown in FIG. 3, due to its greater Shore hardness, portion 18 collapses before portion 14. This allows water to instantly pass around it and out sewer line 70 while clean-out pipe 68 remains blocked by portion 14. Thus, water cannot back up clean-out pipe 68. Water clears the area very rapidly, so that portion 14 can also deflate fairly rapidly to allow member 12 to be pulled out of clean-out pipe 68 by ring 66 and chain 64.

It will be understood that device 10 can be of any suitable length and diameter and of any suitable radial expansibility. In one embodiment, member 12 is sized so that portions 14 and 18 can simultaneously block three inch and four inch diameter pipes. Thus, device 10 is simple, efficient and durable. It is inexpensive and easy to install and remove and is adaptable to a variety of situations. Moreover, it will be noted that portion 18 is tapered down toward outlet 24, allowing for easier passage of member 12 through drain pipes for faster, smoother use.

FIG. 8

A second preferred embodiment of the improved drain pipe plug device of the present invention is schematically depicted in FIG. 8. Thus, device 10a is shown in pipe 54a. Components of device 10 similar to those of device 10 bear the same numerals, but are succeeded by the letter "a". Device 10a is substantially identical to device 10, except that portions 14a, 16a and 18a of member 12a are without external ribs and have smooth exteriors. Sidewall 74a of portion 18a is of the same thickness but of a greater Shore hardness than sidewall 76a of portion 14a. Sidewall 78a of portion 16a is thicker than sidewalls 76a and 78b, but of greater flexibility. Connector 32a is identical to connector 32. Valve 42a is identical to valve 42. Device 10a performs substantially similarly to device 10 and has most of the advantages thereof.

Various modifications, changes, alterations and additions can be made in the improved drain pipe plug device of the present invention, its components and their parameters and in the present method, its steps and parameters. All such changes, modifications, alterations and additons as are within the scope of the appended claims form part of the present invention.

What is claimed is:

1. An improved drain pipe plug device, said device comprising, in combination:
   (a) an elongated, elastomeric, hollow, flexible, resilient unitary tubular member defining a generally central passageway extending throughout the length thereof, with exits at opposite ends thereof, said tubular member having a contiguous, bulbous front outlet portion, a bulbous rear inlet portion and a middle portion, said middle portion being of smaller external diameter and more flexible and resilient than said front and rear portions, so as to facilitate insertion of said device through angled connections between drain pipes, said front and rear portions being radially expansible under air and water pressure, to block drain pipes,
   (b) said front outlet portions having a unitary sidewall of a predetermined thickness having a first predetermined Shore hardness for containing said air and water pressure but which allows radial expansion of the external diameter of said front outlet portion at a first rate of expansion,
   (c) said rear inlet portion having a unitary sidewall for containing said air and water pressure, said sidewall of said rear inlet portion having a thickness which is essentially the same as said pre-determined thickness of said sidewall of said front outlet portion, but having a second pre-determined Shore hardness significantly different from said first determined Shore hardness of said outlet portion, said sidewall of said rear inlet portion allowing radial expansion of the external diameter of said rear inlet portion at a rate of expansion which is significantly different from said first rate of expansion, and
   (d) connector means sealingly connected to said rear inlet portion for introduction of a common source of fluid under pressure into said passageway to each of said portions, to radially expand said tubular member to cause it to plug a drain pipe.

2. The improved drain pipe plug device of claim 1 wherein the front of said front outlet portion is tapered to facilitate passage of said device through sewer and drain pipes.

3. The improved drain pipe plug device of claim 1 wherein said front outlet portion and said rear inlet portion are externally ribbed to minimize frictional resistance and reinforce the sidewalls thereof, thereby facilitating passage of said device through drain and sewer pipes, and wherein said middle portion is also radially expansible.

4. The improved drain pipe plug device of claim 3 wherein said middle, rear and front outlet portions have approximately equal sidewall thicknesses.

5. The improved drain pipe plug device of claim 4 wherein said front outlet and rear inlet portions are of about equal external diameter when in an unexpanded state and wherein said Shore hardness of said outlet portion sidewall is significantly greater than that of said inlet portion sidewall, whereby said inlet portion sidewall expands more rapidly but said outlet portion sidewall collapses more rapidly.

6. The improved drain pipe plug device of claim 5 wherein said rear inlet portion has a sidewall thickness about 100% that of said front outlet portion.

7. The improved drain pipe plug device of claim 1 wherein said connector means comprises at least one of a water line connector and an air hose connector.

8. The improved drain pipe plug device of claim 2 including a relief valve comprising an open elongated tubular cage having an imperforate fluid-blocking transverse wall, said cage being disposed in said tapered part of said front outlet portion, said front outlet portion having an inner sidewall with a transverse groove therein, said transverse wall being secured in said transverse groove to block passage of fluid through said passageway until said tapered portion extends radially sufficiently under pressure to open a pressure-relieving fluid by-pass space between said transverse wall and the inner sidewall of said tapered portion.

9. The improved drain pipe plug device of claim 8 wherein said cage moves rearwardly in said groove during formation of said fluid by-pass space.

10. The improved drain pipe plug device of claim 8 wherein said cage remains essentially stationary in said tapered front outlet portion during formation of said fluid by-pass space.

11. The improved drain pipe plug device of claim 1 wherein said device is dimensioned to expand sufficiently to plug a three inch diameter building clean-out drain with said inlet portion and a four inch diameter main drain with said outlet portion.

12. An improved drain pipe plug device comprising:
   (a) an elongated, flexible, expandible tubular member having a rear inlet member, a front outlet portion and a middle portion,
   (b) said front outlet portion having a unitary sidewall of a pre-determined thickness and a first pre-determined Shore hardness for containing said air and water pressure but which allows radial expansion of the external diameter of said front outlet portion at a first rate of expansion,
   (c) said rear inlet portion having a unitary sidewall for containing said air and water pressure, said sidewall of said rear inlet portion having a thickness which is essentially the same as said pre-determined thickness of the sidewall of said front outlet portion, but with a second pre-determined Shore hardness less than that first determined Shore hardness of said outlet portion, said sidewall of said rear inlet portion allowing radial expansion of the external diameter of said rear inlet portion at a rate of expansion which is significantly greater than said first rate of expansion, (d) said inlet portion having a connector means adapted to connect each of the portions of said tubular member to a common source of fluid under pressure.

13. The plug device of claim 12 wherein said outlet portion is tapered to enable easy insertion of the tubular member into and along a drain pipe having a tortuous path.

14. The plug device of claim 12 wherein said sidewall of said outlet portion expands more slowly but collapses more rapidly than does said inlet portion sidewall.

15. The plug device of claim 12 wherein said tubular member includes tube strengthening means disposed on the external surface thereof.

16. The plug device of claim 12 wherein said tubular member includes anti-slip means disposed on the external surface thereof.

17. The plug device of claim 12 wherein the outside diameter of the middle portion of the tubular member is significantly smaller than the outside diameter of both of the inlet and outlet portions.

* * * * *